(12) United States Patent
Datta

(10) Patent No.: US 7,776,249 B2
(45) Date of Patent: Aug. 17, 2010

(54) METHOD OF MAKING BIPOLAR PLATE

(75) Inventor: Reena L. Datta, Rochester, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 1302 days.

(21) Appl. No.: 11/215,152

(22) Filed: Aug. 30, 2005

(65) Prior Publication Data

US 2007/0045901 A1 Mar. 1, 2007

(51) Int. Cl.
*H05H 1/26* (2006.01)

(52) U.S. Cl. .................. 264/483; 264/34; 264/82; 264/83

(58) Field of Classification Search .......... 264/139, 264/104, 400, 82, 83, 483; 429/34, 38, 39
See application file for complete search history.

(56) References Cited

U.S. PATENT DOCUMENTS

| 5,879,828 | A | * | 3/1999 | Debe et al. ............... 429/41 |
| 6,706,437 | B2 | | 3/2004 | Trapp et al. |
| 2003/0082431 | A1 | * | 5/2003 | Klitsner et al. ............ 429/38 |
| 2003/0096151 | A1 | * | 5/2003 | Blunk et al. .............. 429/34 |
| 2005/0008919 | A1 | * | 1/2005 | Extrand .................... 429/34 |

\* cited by examiner

*Primary Examiner*—Khanh Nguyen
*Assistant Examiner*—Carson Gross

(57) ABSTRACT

A method of making an electrically conductive element, particularly a bipolar plate for a fuel cell, comprises molding an element from a composite material comprising a polymer and an electrically conductive material to produce an element having a polymer-rich skin and removing at least a portion of the polymer-rich skin with a plasma.

7 Claims, 3 Drawing Sheets

METHOD OF MAKING BIPOLAR PLATE

FIELD OF THE INVENTION

The invention relates generally to electroconductive elements, and more particularly flow field plates such as bipolar plates and end plates and to fuel cells containing flow field plates.

BACKGROUND OF THE INVENTION

Fuel cells have been proposed as a power source for automotive vehicles and other applications. One type of fuel cell is the proton exchange membrane (PEM) fuel cell that includes a membrane-electrode-assembly (MEA) comprising a thin, solid polymer membrane electrolyte having an anode on one face and a cathode on the opposite face. The anode and cathode typically comprise finely divided carbon particles, very finely divided catalytic particles supported on the internal and external surfaces of the carbon particles, and proton conductive material intermingled with the catalytic and carbon particles. The MEA is sandwiched between a pair of electrically-conductive contact elements that serve as current collectors for the anode and cathode and that contain appropriate flow channels and openings ("flow field") for distributing the fuel cell's gaseous reactants ($H_2$ or other gaseous fuel supplied to the anode and $O_2$/air or other oxidizing gas supplied to the cathode) over the surfaces of the anode and cathode. In the case of hydrogen as the fuel and oxygen as the oxidizing gas, water is generated at the cathode from the oxidation of the hydrogen fuel.

PEM fuel cells comprise a plurality of the MEAs stacked together in electrical series while being separated one from the next by an impermeable, electrically-conductive contact element known as a bipolar plate or septum. The bipolar plate has two working surfaces, one confronting the anode of one cell and the other confronting the cathode on an adjacent cell in the stack, to conduct electrical current between the adjacent cells. The bipolar plate is formed with flow fields on its working surfaces for gas distribution. The bipolar plate may be made of an electrically conductive, polymeric composite, for example a polymer/graphite composite such as a vinyl ester polymer and conductive powder, e.g., graphite powder, combination. Composite bipolar plates may offer advantages, such as low weight and ease of manufacture because flow fields may be molded in when the plate is formed rather than being engraved into the surface as with metal bipolar plates. Molding the bipolar plate from a composite material, however, produces a polymer-rich outer skin on the molded part that must be removed so as not to interfere with the electroconductivity of the bipolar plate. The skin must be removed in a way that avoids damaging the thin, lightweight bipolar plate.

SUMMARY OF THE INVENTION

The present invention provides a method of manufacturing a composite, electrically conductive element, such as a bipolar plate, in which the electrically conductive element is molded from a composite material including a polymer and an electroconductive material to produce an element having a polymer-rich skin and at least a portion of the polymer-rich skin is removed using a plasma beam. "Polymer-rich skin" refers to a surface layer having a higher amount of polymer relative to the amount of electroconductive material than in the overall part. It is generally known that molding composite materials, that is, filled polymer materials, produces a polymer-rich skin layer in the molded article.

In another aspect, the invention provides a method of decreasing electrical contact resistance of a molded composite part by treating the molded part with a plasma beam.

"A" and "an" as used herein indicate "at least one" of the item is present; a plurality of such items may be present, when possible.

DETAILED DESCRIPTION OF THE PREFERRED EMBODIMENTS

The following description of the preferred embodiment(s) is merely exemplary in nature and is in no way intended to limit the invention, its application, or uses.

In one aspect, the present invention provides a method of making an electrically conductive element in a proton exchange membrane (PEM) fuel cell that includes a membrane-electrode assembly (MEA), the electrically conductive element having a face adjacent to at least one electrode of the MEA. The conductive element comprises a flow field in the face adjacent to the electrode for distributing reactant gas to the electrode and for removing product water from the electrochemical reaction of the fuel cell. In one embodiment, the fuel is hydrogen and the oxidant is oxygen (which may be supplied as air). The flow field has grooves and lands (flat surfaces between and defining the grooves). The conductive element is molded from a polymer composite material filled with electrically conductive material, a polymer-rich outer layer ("skin") being removed from the surface of the lands by a plasma beam to decrease electrical contact resistance of the element.

Figure 1:
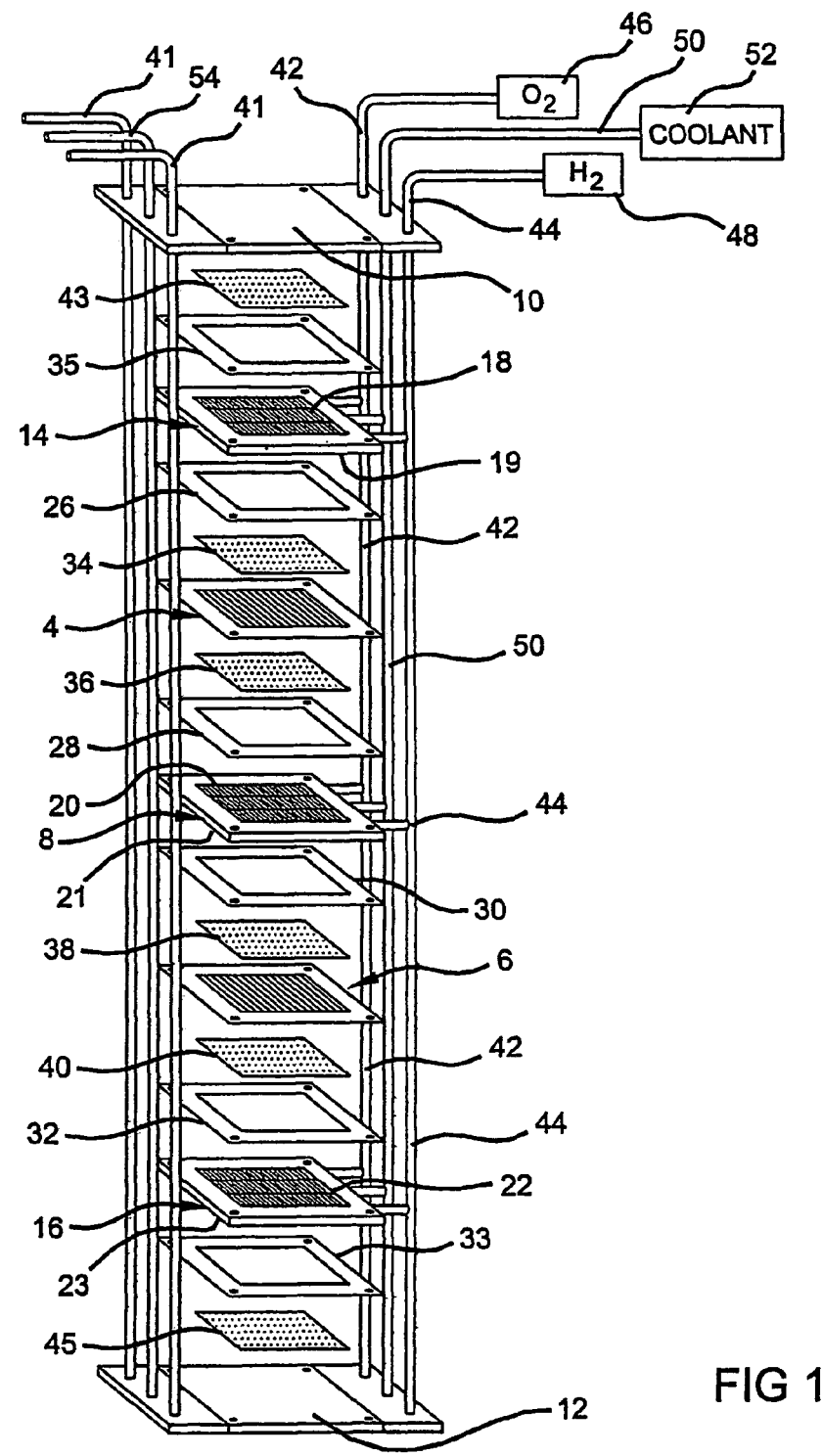
FIG. 1 is a schematic, exploded, isometric illustration of a liquid-cooled proton exchange membrane fuel stack showing only two cells in the stack.

To aid in understanding the invention, an exemplary fuel cell and stack are shown generally in FIG. 1. Two individual proton exchange membrane (PEM) fuel cells connected to form a stack have a pair of membrane-electrode-assemblies (MEAs) 4 and 6 and gas diffusion media 34, 36, 38, 40 separated from each other by an electrically conductive, liquid-cooled bipolar separator plate 8. An individual fuel cell, which is not connected in series within a stack, has a separator plate 8 with a single electrically active side. In a stack, a preferred bipolar separator plate 8 typically has two electrically active sides 20, 21 within the stack, each active side 20, 21, respectively, facing a separate MEA 4, 6 with opposite charges that are separated, hence the so-called "bipolar" plate name for the separator plate 8. The fuel cell stack of FIG. 1 has conductive bipolar plates, but the present invention is equally applicable to the conductive plates ("end plates") of a single fuel cell.

The MEAs 4 and 6, and bipolar plate 8 are stacked together between stainless steel clamping plates 10 and 12, and end contact elements 14 and 16. The end contact elements 14 and 16, as well as both working faces or sides 20, 21 of the bipolar plate 8, contain a plurality of channels forming flow fields on the active faces 18, 19, 20, 21, 22 and 23 for distributing fuel and oxidant gases to the MEAs 4 and 6. The gaseous fuel may be $H_2$ and the oxidant gas may be oxygen (which may be supplied as air containing oxygen). Nonconductive gaskets or seals 26, 28, 30, 32, 33 and 35 provide seals and electrical insulation between the several components of the fuel cell stack. Gas-permeable conductive diffusion media 34, 36, 38 and 40 press up against the electrode faces of the MEAs 4 and 6. Additional layers of conductive media 43, 45 are placed between the end contact fluid distribution elements 14, 16 and the terminal collector plates 10, 12 to provide a conductive pathway therebetween when the stack is compressed during normal operating conditions. The end contact fluid distribution elements 14, 16 press up against the diffusion media 34, 43 and 40, 45 respectively.

Oxygen is supplied to the cathode side of the fuel cell stack from storage tank 46 via appropriate supply plumbing 42, while hydrogen is supplied to the anode side of the fuel cell from storage tank 48 via appropriate supply plumbing 44. Alternatively, air may be supplied to cathode side from the ambient, and hydrogen to the anode from a methanol, methane, or gasoline reformer or the like. Exhaust plumbing 41 for both the $H_2$—$O_2$/air sides of the MEAs is also provided. Additional plumbing 50 is provided for circulating coolant from a storage area 52 through the bipolar plate 8 and end plates 14, 16 and out the exit plumbing 54.

During fuel cell operation, the anode hydrogen gas is split into two protons ($H^+$), thus freeing two electrons. The protons migrate across the membrane of the MEA 4, 6 to the cathode side. The oxygen or air introduced at the cathode side flows into the porous electrode. Catalyst particles within the cathode facilitate a reaction between the protons ($H^+$) and oxygen ($O_2$), to form water within the electrode. The gas flow from the porous cathode material must be maintained despite the water generation. Flooding the electrode with water impedes gas flow to the PEM through the MEA 4, 6, decreasing or interrupting reactions occurring at the MEA 4, 6.

The bipolar plate is constructed of an electroconductive composite material, such as a polymer/graphite composite made by a bulk molding compound (BMC) process. For example, United States Patent Application 2005/0001352, Chen-Chi Martin Ma et al. and U.S. Pat. No. 6,248,467, Wilson et al., both of which are incorporated herein by reference, describe composite bipolar plates made from materials containing a vinyl ester polymer and conductive powder, e.g., 60-80 wt. % graphite powder. Other polymers, e.g., phenolics, may be used, and other conductive materials, e.g. conductive carbon black or metal flake, may be used. The molding step results in a polymer-rich skin, or surface layer, as the outer surface of the molded material. This layer is removed with a plasma beam or other plasma source to reduce electrical contact resistance of the bipolar plate.

The plasma is desirably produced either by a radio frequency (rf) field or by microwave energy coupled to the natural resonant frequency of plasma electrons in a static magnetic field. A low-temperature plasma may be obtained by applying a voltage at gas pressures between about 50 mtorr to about 5 torr. The electrodes may be external or internal parallel planar electrodes. The residual gas used in sustaining the plasma may be, for example and without limitation, hydrogen, methane, nitrogen, oxygen, or a noble gas such as helium or argon. The energetic discharge environment is sufficient to decompose gas molecules into electrons, ions, atoms, free radicals, and molecules in ground and excited states.

The bipolar plate may include an electrically non-conductive base plate having electrically conductive outer layers in communication with other electrically conductive layers across a fuel cell stack. The bipolar plate exterior surfaces adjacent on either side to a membrane-electrode-assembly may be molded with gas flow channels, or flow fields, to aid in distributing the reactant gases over the surface of the PEM, or the gas flow fields may be etched or cut into the surfaces after the bipolar plate is molded. When the fuel cell is fully assembled, each exterior surface of the bipolar plate presses against a gas diffusion media (such as 36 or 38 in FIG. 1, which may be, e.g., carbon/graphite paper) that, in turn, presses against the MEAs (such as 4 or 6 in FIG. 1, respectively).

Figure 2:
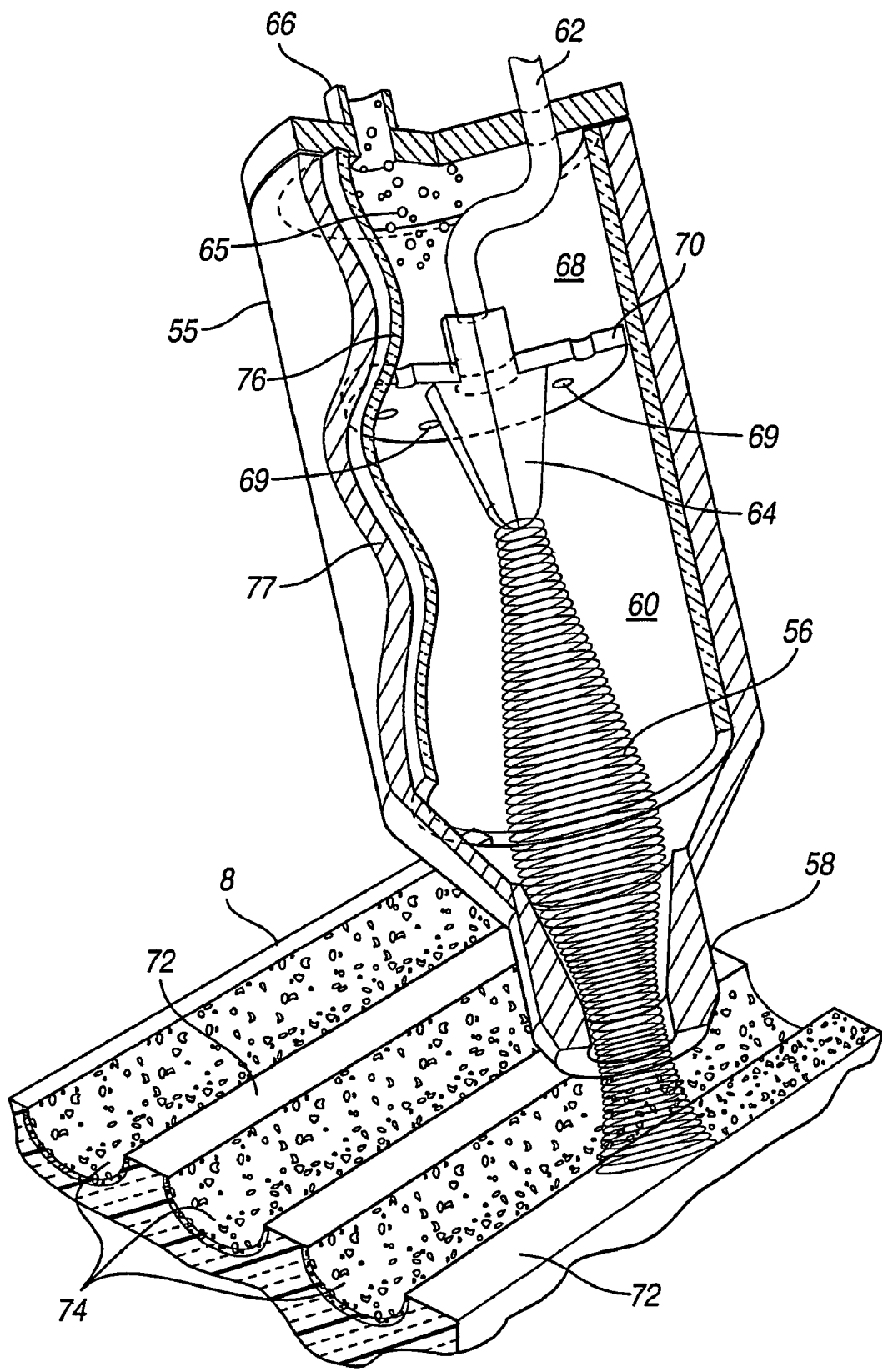
FIG. 2 is a partially cut-away, perspective view of a plasma generator positioned to treat a substrate.

FIG. 2 shows a plasma beam generator 55 positioned to apply a plasma beam 56 to the surface of a bipolar separator plate 8. Plasma beam generator 55 has an outer housing 77 and insulation layer 76. Voltage supply 62 provides electricity to electrode 64. Ionization gas 65 enters through inlet 66, into chamber 68, and through small boreholes 69 in screen 70 into discharge volume 60 to contact the electrode 64. A plasma beam 56 is formed at the electrode 64, where it is rotating at high potential. The plasma beam 56 passes through plasma nozzle 58, which serves to concentrate and direct the beam, to where it contacts the surface of bipolar plate 8 at zero potential. Bipolar plate 8 has lands 72 and grooves 74 The plasma removes organic material (which disintegrates) from a desired portion of at least the surfaces of lands 72 to improve contact resistance of the bipolar plate surface. The plasma treatment does not damage or deform the fragile bipolar plate 8.

Figure 3:
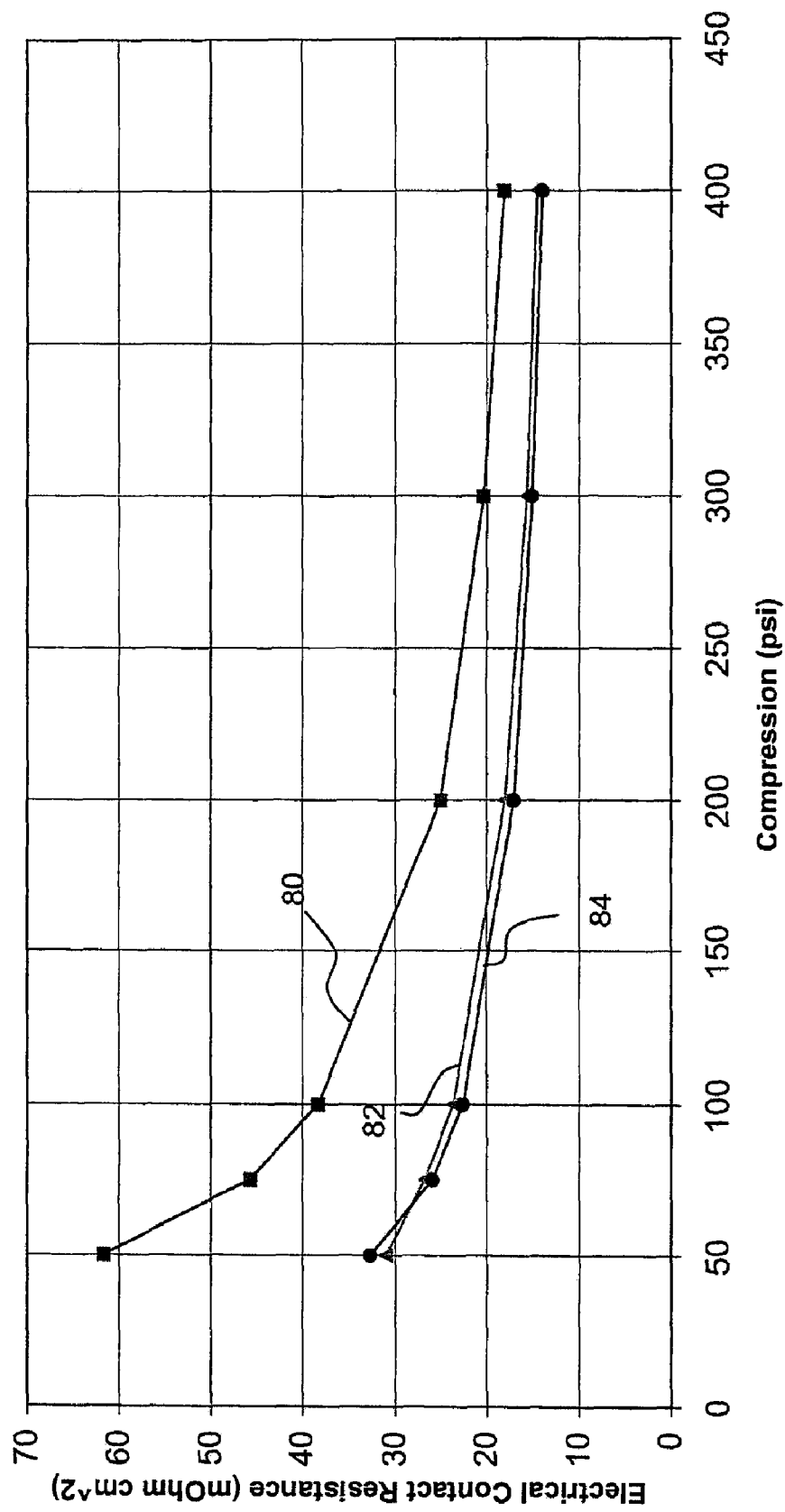
FIG. 3 is a graph showing the voltage drop of a composite bipolar plate before and after plasma treatment.

The surface area of the bipolar plate, particularly the surfaces of the lands because they must provide electrical contact in the fuel cell, are treated with plasma for a time sufficient to remove the polymer-rich skin to expose the more electroconductive interior material. For example, a treatment period of ten minutes may be sufficient, using air as the ionization gas. The treatment period may be shorter or longer for other ionization gases (e.g., pure oxygen). FIG. 3 shows electrical contact resistance measured for a range of compression loads (exerted by clamping plates 10 and 12) from 50 to 450 psi. Curve 80 is the electrical contact resistance measured for a bipolar plate of a polymer/graphite composite as molded, with the polymer-rich skin intact. Curve 84 is the electrical contact resistance measured for a bipolar plate of a polymer/graphite composite after a thin layer is physically machined from the surface by abrasion. Curve 82 is the electrical contact resistance for a bipolar plate of a polymer/graphite composition that has been plasma treated with 20 passes (about 10 minutes total treatment time with the plasma beam) using a configuration as shown in FIG. 2 and air as the ionization gas. As can be seen from the graph, the plasma treatment is as effective in removing the thin polymer-rich skin as is machining. the surface, resulting in comparable contact resistances as physical abrasion without risking the damage that may occur to the fragile bipolar plate during physical abrasion techniques. The plasma treatment offers the additional advantage of being a method by which the surface can be treated in ambient conditions.

Plasma treatment of the molded part provides a method for more uniform and more easily controlled surface activation as compared to abrasion techniques. The surface of a composite, molded, electroconductive element may be selectively activated by controlling the area contacted by the plasma beam, the duration of plasma treatment, and the strength of the plasma beam (for example, by selection of the ionization gas and electrode potential). Thus, electrical contact resistance of the surface can be modified to a desired extent.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of making a fuel cell, comprising:
   providing a molded bipolar plate comprising a composite material comprising a polymer and an electrically conductive material embedded in said polymer, said molded bipolar plate having a polymer-rich outer layer including said electrically conductive material, wherein the bipolar plate is molded with a surface having a plurality of lands and grooves;
   removing only said polymer of the polymer-rich outer layer including said electrically conductive material with a plasma from at least a portion of the surfaces of the lands by controlling the area contacted by a plasma beam to an area consisting of said portion; and
   incorporating the molded bipolar plate into a fuel cell.

2. A method according to claim 1, wherein the plasma is obtained from a gas comprising at least one of hydrogen, methane, nitrogen, oxygen, air, and noble gases.

3. A method according to claim 1, wherein a removal of only said polymer from said polymer-rich outer layer with the plasma decreases the electrical contact resistance of the bipolar plate in the fuel cell.

4. A method of making an electrically conductive element comprising
   molding an element from a composite material comprising a polymer and an electrically conductive material to produce an element, said element having a polymer-rich skin and a plurality of lands and grooves; and
   removing with a plasma only said polymer from at least a portion of the polymer-rich skin of the surfaces of the lands by controlling the area contacted by a plasma beam to an area consisting of said portion.

5. A method according to claim 4, wherein the plasma is obtained from a gas comprising at least one of hydrogen, methane, nitrogen, oxygen, air, and noble gases.

6. A method of improving contact resistance in an element having a plurality of lands and grooves molded from a mixture of polymer and an electroconductive material, comprising removing at least a portion of the polymer-rich skin of the surfaces of the lands with a plasma by controlling the area contacted by a plasma beam to an area consisting of said portion.

7. A method according to claim 6, wherein the plasma is obtained from a gas comprising at least one of hydrogen, methane, nitrogen, oxygen, air, and noble gases.

* * * * *